Aug. 22, 1967   G. W. STIEFVATER ETAL   3,337,005
VEHICLE BRAKE STRUCTURE
Filed Feb. 2, 1966
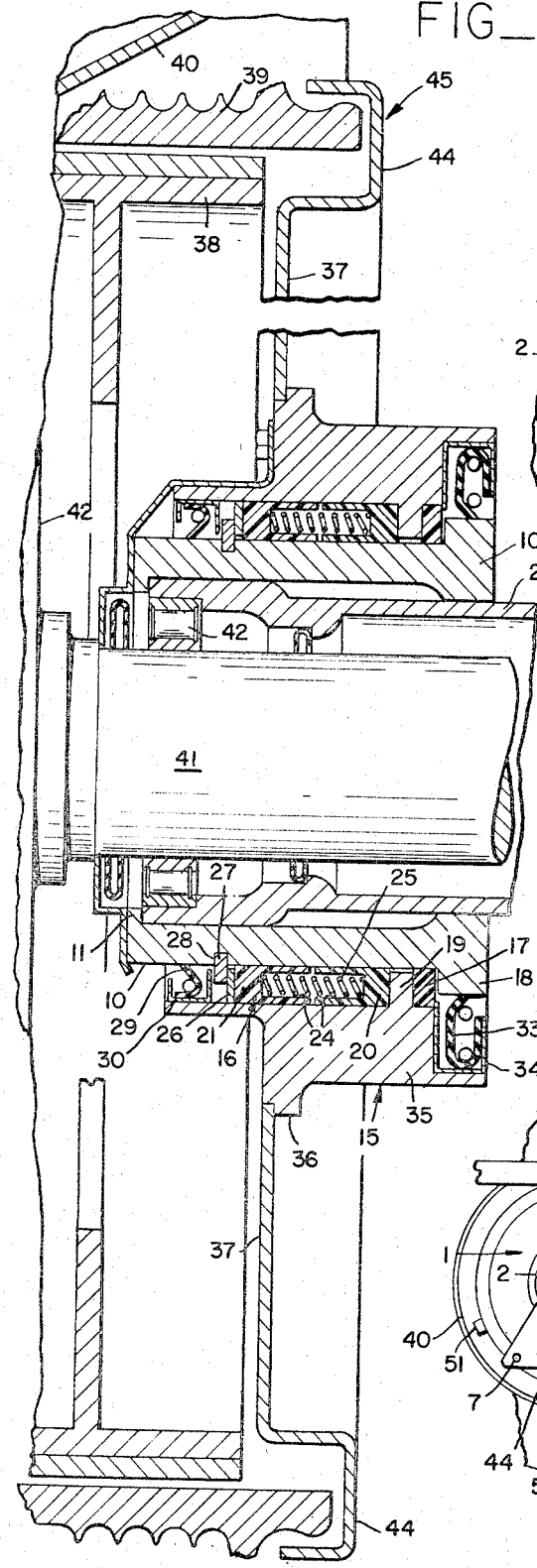
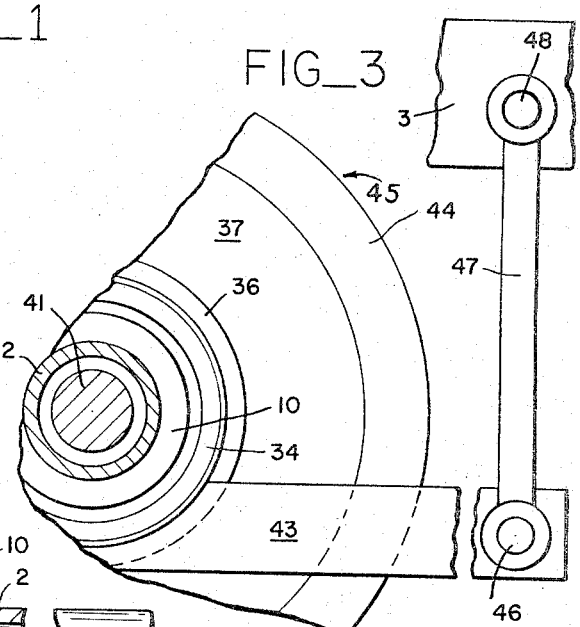
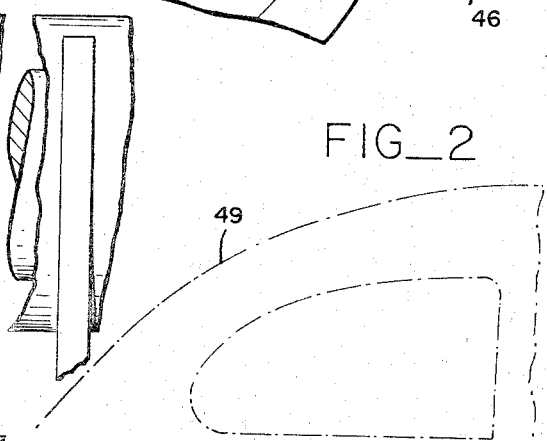
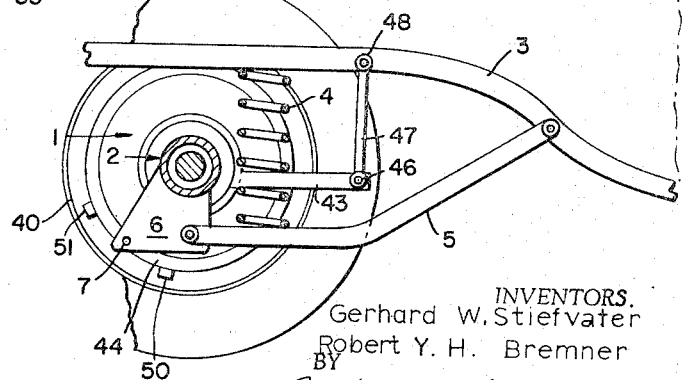
INVENTORS.
Gerhard W. Stiefvater
Robert Y. H. Bremner
BY Boyken, Mohler, Foster and Schlemmer
ATTORNEYS

United States Patent Office 3,337,005
Patented Aug. 22, 1967

3,337,005
VEHICLE BRAKE STRUCTURE
Gerhard W. Stiefvater, 1090 Vallombrosa Ave., Chico, Calif. 95926, and Robert Y. H. Bremner, Chico, Calif.; said Bremner assignor to said Stiefvater
Filed Feb. 2, 1966, Ser. No. 524,539
4 Claims. (Cl. 188—2)

This invention relates to a brake mounting means of generally the same type shown in U.S. Patent No. 2,434,055 of Jan. 6, 1948, to C. S. Sauer, and has for one of its objects the provision of an improved structure for supporting and connecting the backing plate of the rear wheel brakes on an automobile to the chassis of the automobile for transmitting torque from the rear wheels, by way of the backing plates to the chassis in a downward direction for eliminating the forward pitch or dip of the chassis upon application of the brakes, and also for substantially eliminating the skidding of the automobile upon a sudden and strong application of the brakes.

The principle involved in the present invention is not new, but heretofore one of the main problems has been in providing a bearing structure and arrangement for supporting the rotatable bearing plate for each rear wheel on the rear axle housing, that would be simple to construct and to install, and yet resist objectionable wear and that would transmit the torque from the rear wheels to the chassis, more efficiently.

One of the objects of the present invention is the provision of structure that will overcome the objections to prior structure and that will accomplish betters results.

In the present structure, the rear axle housing is not weakened, nor has the efficiency of the structure been impaired due to the elements, such as rain, mud, snow, ice, etc.

In using the principle of transmititng the torque from the rear wheels through the backing plates to the chassis, the backing plate must be free to rotate relative to the axle housing. The brake shoes are carried by the backing plate for rotation therewith and a radially extending arm secured to the backing plate of each rear wheel extends forwardly for a pivotal connection at its forward end with the chassis. Thus when the brakes are applied the wheel and backing plate rotate together to transmit the wheel torque to the chassis.

By the present invention the bearing is relatively long in the direction of the axis of the wheel axles and each bearing is solidly supported substantially from end to end on each end of the wheel housing, with the radial arm through which th torque is transmitted being secured to the bearing intermediate its ends. Supporting the bearing on the axle housing in this manner insures against the objections heretofore found to exist.

Other objects and advantages will appear in the drawings and in the description.

In the drawings:

FIG. 1 is a cross sectional view taken through the mounting for the backing plate, including the axle housing, and parts of the brake drum, and brake shoe and wheel.

FIG. 2 is a reduced size semidiagrammatic view illustrating the connection between the backing plate of FIG. 1, and the standard axle housing and sway stabilizer, the axle housing being indicated in cross section.

FIG. 3 is an enlarged view of a portion of FIG. 2.

In detail referring to FIG. 2 a rear wheel backing plate is generally designated 1, the axle housing is indicated at 2. One of the side frame members of the chassis is shown at 3 extending over the rear axle housing, and a coil spring 4 yieldably supports the chassis frame at a point just ahead of the axle housing, which spring reacts between a bar 5, that, in turn, is pivotally supported at one end thereof to a plate 6 and the opposite end of the bar 5 is pivotally connected to the frame member 3. This structure is the same at both sides of the chassis, and a sway bar 7 extends from one of the plates 6 to the axle housing at the opposite side of the automobile. Thus a sway bar and the arm 5 are not part of the present invention, but are conventional, and as later will be explained, the plates 6 cooperate with the present invention.

In conventional structure, the axle housing 2 would be provided with a radially outwardly projecting flange (not shown) to which the backing plate for each rear wheel is rigidly bolted. In the present invention said flange is omitted, and an inner tubular bearing support 10 is welded or otherwise rigidly secured directly against each outer end portion of the rear axle housing in coaxial, encircling relation thereto.

Inasmuch as the structure on each end of the tubular housing 2 is the same, the following description of one end will be adequate for both.

Bearing support 10 is formed at its outer end with a radially inwardly projecting flange 11 that, in turn, is adapted to abut the outer end of the axle housing 2, while a substantial length of the bearing support 10 adjacent to said flange is supported directly against the outer surface of the axle housing, as is the inner end portion of said bearing. This bearing support 10 could be against the axle housing for its full length, but the outside contour of the rear axle housing at its ends has substantially the contour shown in the drawings, and the inner tubular member 10 is adapted to be used on the conventional axle housing.

The use of the words "inner" and "outer" in referring to the ends of the bearing structure are used with reference to the center line of the automobile chassis. Thus the inner end of any portion of the bearing structure is the end nearest such center line, while the outer end is the end that is remote therefrom.

The use of the words "inner and "outer" are also used with reference to the central axis of the axle housing. Thus the tubular bearing support 10 is around the outer side of the housing.

An outer tubular body 15 is part of the bearing structure, and is coaxial with and around the inner bearing support 10, and extends substantially from end to end of the latter.

Disposed between the support 10 and body 15 is a tubular bearing generally designated 16 that is divided transversely of its axis into several sections, namely; an inner end section 17 that is adjacent to the inner end of the support 10, and that is disposed between an annular radially outwardly projecting flange 18 formed on the inner end of the support 10 and a radially inwardly projecting flange 19 on and within the tubular body 15 and that is spaced from the inner end of the latter.

At the axially outer side of the flange 19 are a pair of axially aligned bearing sections 20, 21. These sections are of the same thickness, radially, as the end section 17, and of substantially greater length, axially, and they are formed with registering opposedly opening holes 24 on their adjacent sides, in each opposed pair of holes is an expansion coil spring 25 that functions to yieldably urge the sections 20, 21 axially outwardly relative to each other.

The bearing section 21 is the outermost section of the pair thereof, and the outer end surface of said section is yieldably held against an annular washer 26, that, in turn, is against an annular stop member 27. The stop member 27 is held in a radially outwardly opening groove 28 formed in the outer side of the bearing support 10, and said stop member may be a transversely split spring ring adapted to be sprung into said groove.

From the foregoing, it is seen that the bearing sections 20, 21 will be yieldably held against flange 19 and the ring or stop member 27.

The bearing 16, which is made up of sections 17, 20, 21 fit the space between the inner bearing member 10 and the tubular body 15 and each is solid, except for holes 24 and each is of an anti-friction material, such as nylon.

An outer flexible annular seal 29 of conventional structure, within a shell 30, functions to seal the space between the outer ends of the support 10 and body 15 against the entering of foreign material to the bearing, and an annular conventional flexible seal 33 within a shell 34 is provided at the inner ends of the support 10 and outer tubular member 15 to securely seal the space between said support and member at said inner ends. Shells 30, 34 are fitted in the usual manner within the outer and inner ends of the outer tubular member 15.

The center portion 35 of the tubular member 15 is relatively thick compared with the end portions, and is in turn, formed with a radially outwardly projecting flange 36 at substantially the mid-section of portion 15, which flange is preferably in the same place as that in which the flange on a conventional axle housing would be positioned, were such flange not omitted, and which omitted flange, was formerly used for bolting the conventional backing plate.

In the present invention, the backing plate, designated 37 is welded or otherwise rigidly secured to the flange 36 on the outer tubular member 15. This backing plate is otherwise conventional, carrying the brake shoes 38 that are adapted to be actuated in the usual way for energizing the brake drum 39 that is rigid with the wheel 40. Wheel 40, in turn, is secured in the usual manner to the drive axle 41, and the latter is supported on bearings 42 within axle housing 2. The axle 41 that is illustrated is of the usual type having an upset end portion 42 to which the wheel 40 is bolted. All of said wheel except the rim portion is omitted in FIG. 1.

Referring specifically to FIG. 3, a generally radically forwardly extending arm 43 is welded or otherwise rigidly secured at the rear end to and against the inner side of the flange 36 and to and against the inner side 44 of the laterally outwardly opening annular channel 45 formed in backing plate 37 around its outer periphery, and into which the brake drum 39 (FIG. 1) projects. The words "front," "rear," "forward" and "forwardly" are used relative to the forward and rear ends of the automobile.

The arm 43 is pivotally connected at its forward end at 46 to the lower end of a link 47 that, in turn, is pivotally connected at 48 at its upper end to the chassis frame 3 at a point that may be approximately within the laterally projected confines of the tire on wheel 40.

In operation, upon application of the brakes, the torque from the wheels 40, including the tires thereon, is transmitted to the backing plates 37 that are rotatable on bearings 16, and which backing plates are connected with the tubular outer bearing member 35 at a point spaced between its ends.

The torque so transmitted to the backing plates, is, in turn, transmitted through arms 43 and links 47 to the chassis 3.

The body 49 (FIG. 2) being rigid on the chassis 3 will be drawn downwardly at its rear end to compress springs 4 which more than counters the tendency of the forward end of the body 49 and chassis to dip downwardly, and persons seated within the body tend to be more firmly seated against the seat upon sudden and strong application of the brakes, rather than being thrown forwardly. Also the downward force applied to the body through such application of the brakes overcomes the present tendency of the rear tires to skid by effecting what may be termed a "squatting" effect, rather than a lifting effect. Where no such force is applied, as in conventional structure, a sudden and powerful application of the brakes causes, in many instances, loss of control by the driver, due to the lateral sliding of the rear tires to one side and the other as the driver attempts to gain control. This is particularly noticable where the highway may be slightly corrugated.

The position of the bearing 16 relative to the backing plate, its structure and its direct mounting on the axle housing are important features since they have been found to eliminate detrimental wear of the bearings and to enable the particular brake system to efficiently operate irrespective of temperature variations and weather conditions, whereas in prior arrangements, such results were not obtained with the consistency desired or required.

Furthermore, in the present structure the backing plate and axle housing are substantially the same as in standard structure, except for the provision of mounting the bearing that supports the backing plate.

In a system of the present type, it is desirable that a safety means be incorporated to assure operation of the brakes, both when the automobile is moving forward or rearward, in the event the connection between the backing plate and the chassis should become inoperative for any reason. Such safety means is in the form of a pair of spaced projections 50, 51 (FIG. 2) rigid with the backing plate and projecting laterally inwardly to opposite sides of plate 6, and spaced at such opposite sides. One or the other of these projects 50, 51 will engage the plate 6 in the event link 47 or arm 43 should fail to be operative for any reason whatever.

As already mentioned, one of the plates 6 is conventional, and the same or similar type of plate may be secured to the end of the axle housing opposite to the existing plate, if desired, or any other suitable and similar stop means may be rigidly secured to the axle housing, if desired.

The bearing 16 is preferably of plastic material commonly known under the trade name of nylon, which eliminates the necessity of lubrication and the other problems where bearings that require lubrication are used.

There being no cutting of the original housing, or axial offsetting of the connection of arm 13 with the bearing 16 and the number 15 no unbalanced or unequal strains are placed on the bearing when the brakes are applied.

The claims appended hereto are intended to cover any modifications or changes that may come within the scope of the terms used.

We claim:

1. A torque transmitting structure for use on a vehicle that includes a chassis sprung onto a substantially non-rotatable axle housing having an axle rotatably supported therein and rear ground wheels on the ends of said axle outwardly of the ends of said axle housing each including a brake engaging surface rigid therewith for frictional engagement with a brake member, comprising:

(a) a bearing for securement onto each of the opposite end portions of said axle housing, said bearing including an inner, horizontally elongated tubular member having a bore adapted to fit on and to be stationarily supported at its opposite ends and secured to each of the opposite end portions of said axle housing;

(b) an outer tubular member and substantially non-friction means approximately centrally between opposite ends of said inner tubular member supporting said outer tubular member on said inner tubular member coaxial with and for rotation on said inner tubular member;

(c) means at a point spaced approximately midway between opposite ends of said inner and said outer tubular members for securement thereto of a circular backing plate, centrally thereof, rigid with said outer tubular member;

(d) a circular backing plate for each of said rear wheels centrally secured onto said outer tubular member at said point each backing plate having a brake member supported thereon for movement into and out of such brake engaging surface, and an arm rigid with each backing plate projecting generally radially therefrom and forwardly relative to the normal forward direction of movement of said vehicle when said tubular members are in positions secured on said end portions of said axle housing;

(e) means on the outer end of each of said arms for pivotally connecting the outer ends of said arms to said chassis, said outer ends of said arms terminating at points approximately adjacent to the outer peripheries of such wheels when said tubular members are in said positions.

2. In a torque transmitting structure as defined in claim 1, (f) said arms being rigidly secured to said backing plates at the outer peripheries thereof, and (g) each of said outer tubular members being horizontally elongated and provided with a relatively thick central portion, and each backing plate being secured to said relatively thick central portion, (h) the radially inwardly facing surface of said central portion being in direct engagement with said non-friction means and supported thereon, and each outer tubular member having opposite end portions projecting axially outwardly of said non-friction means and spaced radially outwardly of said inner tubular member, (i) an oil seal positioned at the opposite ends of said non-friction means and between said opposite end portions and said inner tubular member.

3. In a torque transmitting structure as defined in claim 1, (f) said non-friction means comprising a pair of solid, coaxial, cylindrical bearing elements of "nylon" rotatably fitting between each of said inner and said outer tubular members, and on which the central portion of said outer tubular member is supported;

(g) annular stop members coaxial with and respectively rigid with said inner and said outer tubular member relative to axial movement thereof extending substantially across the space between said inner and outer tubular members; adjacent to opposite ends thereof; and (h) means between each pair of said bearing elements yieldably urging them axially outwardly against the stop members that are adjacent to the ends of said inner and outer tubular members.

4. A torque transmitting structure as defined in claim 1, that includes, (f) spaced rigid stops secured rigidly to said axle housing, and (g) means rigid with each of said backing plates projecting between said stops for engaging the latter in the event of failure of said arms or said last mentioned means to hold said backing plate against free rotation when said tubular members are in said positions and the brake member on said backing plate is moved into engagement with said brake engaging surface.

References Cited

UNITED STATES PATENTS 2,434,055  1/1948  Sauer _____ 188—2
3,126,073  3/1964  Sauer _____ 188—2

DUANE A. REGER, *Primary Examiner.*